United States Patent
Nagatsuka

(10) Patent No.: US 7,339,859 B2
(45) Date of Patent: Mar. 4, 2008

(54) OPTICAL DISK APPARATUS AND OPTICAL PICKUP DEVICE EQUIPPED WITH SPHERICAL ABERRATION MECHANISM

(75) Inventor: Osamu Nagatsuka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 564 days.

(21) Appl. No.: 11/020,103

(22) Filed: Dec. 27, 2004

(65) Prior Publication Data

US 2005/0157608 A1 Jul. 21, 2005

(30) Foreign Application Priority Data

Jan. 21, 2004 (JP) ............... 2004-013006

(51) Int. Cl.
*G11B 7/00* (2006.01)

(52) U.S. Cl. ............... 369/44.14; 369/112.1

(58) Field of Classification Search ......... 369/112.01, 369/112.02, 112.1, 44.14, 44.15, 44.23, 44.24, 369/118, 44.11, 44.12
See application file for complete search history.

(56) References Cited

U.S. PATENT DOCUMENTS 6,411,596 B1 6/2002 Nagatsuka ............... 369/291
6,901,599 B2 5/2005 Nagatsuka ............... 720/675
6,968,563 B2 * 11/2005 Nagai ............... 720/682
2004/0051990 A1 3/2004 Nagatsuka ............... 360/69

FOREIGN PATENT DOCUMENTS

JP 2002312971 10/2002
JP 2003091847 3/2003

* cited by examiner

*Primary Examiner*—Nabil Hindi
(74) *Attorney, Agent, or Firm*—Fitzpatrick, Cella, Harper & Scinto

(57) ABSTRACT

The present invention provides an optical disk apparatus and an optical pickup which are of a thin type and capable of correcting spherical aberration, including: a semiconductor laser for emitting light; an objective lens for condensing the light from the semiconductor laser on a recording layer through a light transmission layer; at least two optical elements arranged between the semiconductor laser and the objective lend and having a predetermined refractive power; a spherical aberration correction element driving mechanism for moving at least one of the optical elements along an optical axis so as to cancel spherical aberration of imaging light on the recording layer; and a lens holder for holding at least one of the optical elements, a part of the lens folder being inserted into an opening of a cartridge and which.

4 Claims, 4 Drawing Sheets

OPTICAL DISK APPARATUS AND OPTICAL PICKUP DEVICE EQUIPPED WITH SPHERICAL ABERRATION MECHANISM

BACKGROUND OF THE INVENTION

1. Field of the Invention

The present invention relates to an optical disk apparatus and an optical pickup device for recording information on an optical disk or reproducing information therefrom, in particular, an optical disk apparatus and an optical pickup equipped with an optical element for correcting spherical aberration in a beam spot generated due to a thickness error in an optical disk protecting substrate.

2. Related Background Art

Recently, in the technical field in which the recording or reproduction of information signals is effected by using, for example, an optical disk as an information recording medium, the development of an optical disk apparatus having a small size and a large capacity is under way in order to handle high definition still images, moving pictures, etc. An optical disk apparatus is equipped with an optical pickup device for forming a beam spot on the information recording surface of an optical disk, and, as is known in the art, in this optical pickup device, there is generated spherical aberration when a light beam emitted from a light source passes through a transparent protective substrate layer for protecting the information recording layer. As a method of correcting spherical aberration, a method is known according to which an optical element for correction is moved in the optical axis direction.

As a method using such an optical element for correction, for example, Japanese Patent Application Laid-Open No. 2002-312971 proposes use of a device in which there are provided a movable optical element for correcting spherical aberration and a stationary optical element, wherein a movable optical element holder is moved by a DC motor driving force through a driving mechanism, thereby correcting spherical aberration.

Similarly, Japanese Patent Application Laid-Open No. 2003-091847 proposes a device for correcting spherical aberration which uses a concave lens and a convex lens for spherical aberration correction, wherein the concave lens is held by a lens holder, which is driven by a stepping motor, thereby effecting spherical aberration correction.

In the above prior-art techniques, the optical disk is neither accommodated in a cartridge nor reduced in the size and thickness of the pickup device. If such a spherical aberration correcting device is applied to a small and thin optical pickup device which uses a cartridge, such as a portable MD drive, the following problems will be involved.

In the technique as disclosed in Japanese Patent Application Laid-Open No. 2002-312971, the movable optical element holder holding the movable optical element is formed as a cylinder surrounding the periphery of the optical element, and is driven in the optical axis direction of the optical element by a DC motor while guided by a reference shaft. While the thickness of the movable optical element holder with respect to the driving mechanism including the DC motor is not explicitly given here, this holder has a problem that the thickness of the optical element holder in a direction perpendicular to the optical axis of the optical element is rather large with respect to the diameter of the optical element.

Similarly, in the technique as disclosed in Japanese Patent Application Laid-Open No. 2003-091847, the lens holding member for holding the concave lens out of the expander lenses is formed so as to surround the entire periphery of the concave lens, and the outer diameter of the lens holding member is very large as compared with the lens diameter, so that the width of the optical pickup device in a direction perpendicular to the optical axis of the spherical aberration correction lens group is rather large, resulting in a rather large optical pickup device.

SUMMARY OF THE INVENTION

It is an object of the present invention to provide an optical disk apparatus and an optical pickup device which are of a thin type and capable of spherical aberration correction.

The optical disk apparatus of the present invention is an optical disk apparatus for recording information on an optical disk accommodated in a cartridge or reproducing recorded information from the optical disk includes:

a light source;

an objective lens for condensing light from the light source on the optical disk;

at least two optical elements arranged between the light source and the objective lens and having a predetermined refractive power;

a moving mechanism for moving at least one of the optical elements along an optical axis to cancel spherical aberration of imaging light on the recording surface of the optical disk; and a lens holder for holding at least one of the optical elements, a part of the lens holder being inserted into an opening of the cartridge.

Further, the optical pickup device of the present invention is an optical pickup device for use in an optical disk apparatus which records information on an optical disk accommodated in a cartridge or reproduces recorded information from the optical disk includes:

a light source;

an objective lens for condensing light from the light source on the optical disk;

at least two optical elements arranged between the light source and the objective lens and having a predetermined refractive power;

a moving mechanism for moving at least one of the optical elements along an optical axis to cancel spherical aberration of imaging light on the recording surface of the optical disk; and a lens holder for holding at least one of the optical elements, a part of the lens holder being inserted into an opening of the cartridge.

DETAILED DESCRIPTION OF THE PREFERRED EMBODIMENTS

Figure 1:
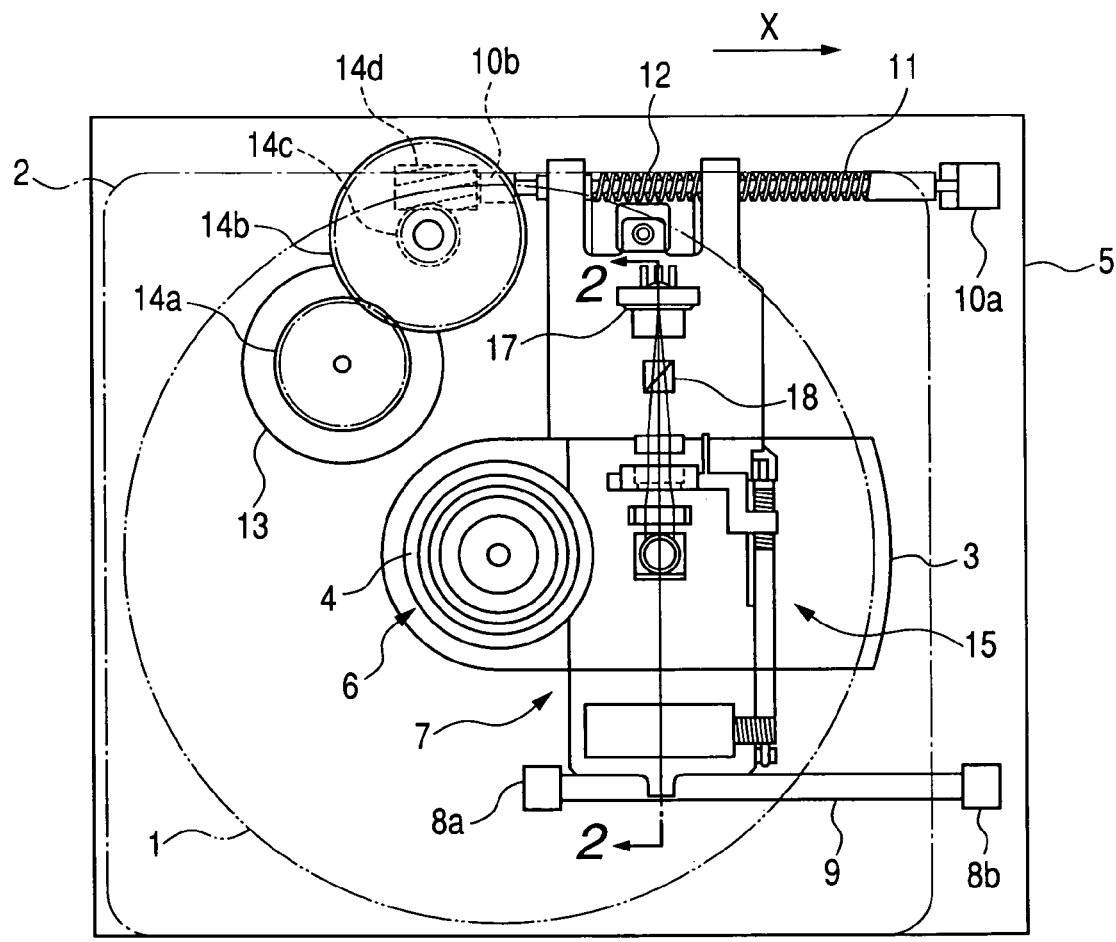
FIG. 1 is a perspective plan view of an optical disk apparatus according to an embodiment of the present invention.

Next, a best mode for carrying out the present invention will be described in detail with reference to the drawings. FIG. 1 is a perspective plan view of an optical disk apparatus according to an embodiment of the present invention. In FIG. 1, reference numeral 1 indicates an optical disk serving as an information recording medium, reference numeral 2 indicates a cartridge accommodating the optical disk, reference numeral 3 indicates an opening provided in the cartridge, and reference numeral 4 indicates a turntable on which the optical disk 1 is to be placed. The turntable 4 is provided at the distal end of a spindle motor 6 installed on a chassis 5 constituting the substrate for the mechanism portion of the apparatus.

Reference numeral 7 indicates an optical pickup device in which a light beam is emitted to the optical disk 1 to record on the disk or read an information signal from the disk. The optical pickup device 7 moves along the recording surface of the optical disk 1 in a disk radial direction (in the direction shown by the arrow X of FIG. 1) by using as guide means a guide shaft 9 supported by guide shaft support members 8a and 8b provided on the chassis 5 and a lead screw 11 rotatably supported by lead screw support members 10a and 10b.

Figure 4:
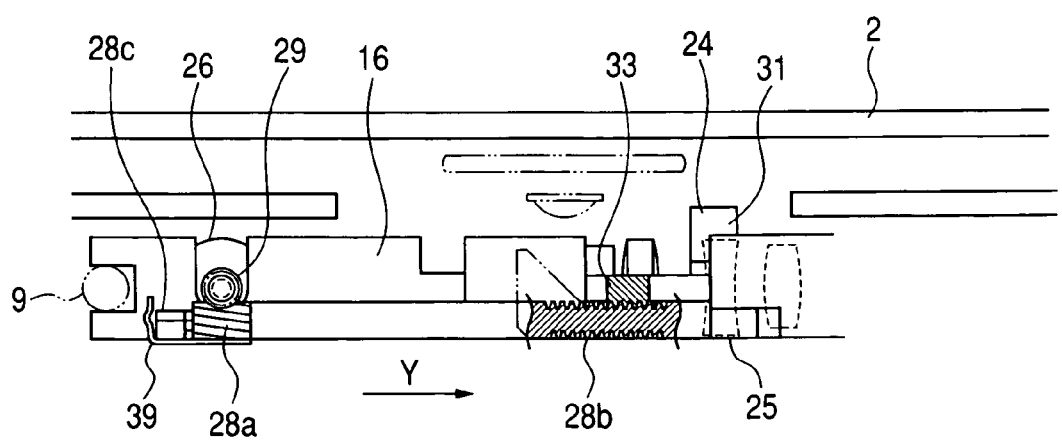
FIG. 4 is a side view of FIG. 3.

In this regard, there is adopted a mechanism in which a rack gear 12 mounted to the back surface of the optical pickup device 7 so as to extend in a direction perpendicular to the disk radial direction is engaged with the lead screw 11 and in which the driving force of a traverse motor 13 is transmitted to the lead screw 11 through reduction gears 14a through 14d; the lead screw 11 is rotated by the driving of the traverse motor 13, thereby moving the optical pickup device 7 in the radial direction of the optical disk 1. Further, at one end of the optical pickup device 7, there is provided a U-shaped protrusion, which is engaged with the guide shaft 9 as shown in FIG. 4, thereby enabling the optical pickup 7 to slide.

Figure 2:
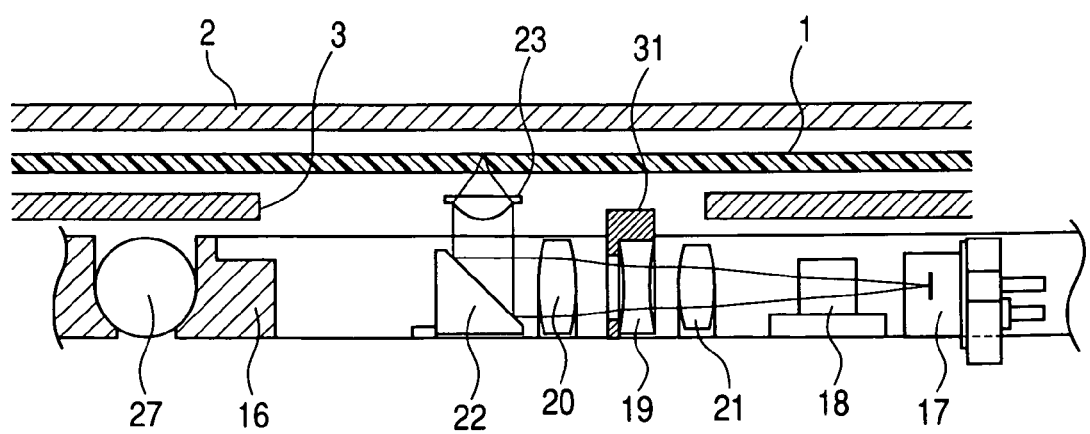
FIG. 2 is a sectional view taken in the line 2-2 of FIG. 1.
Figure 3:
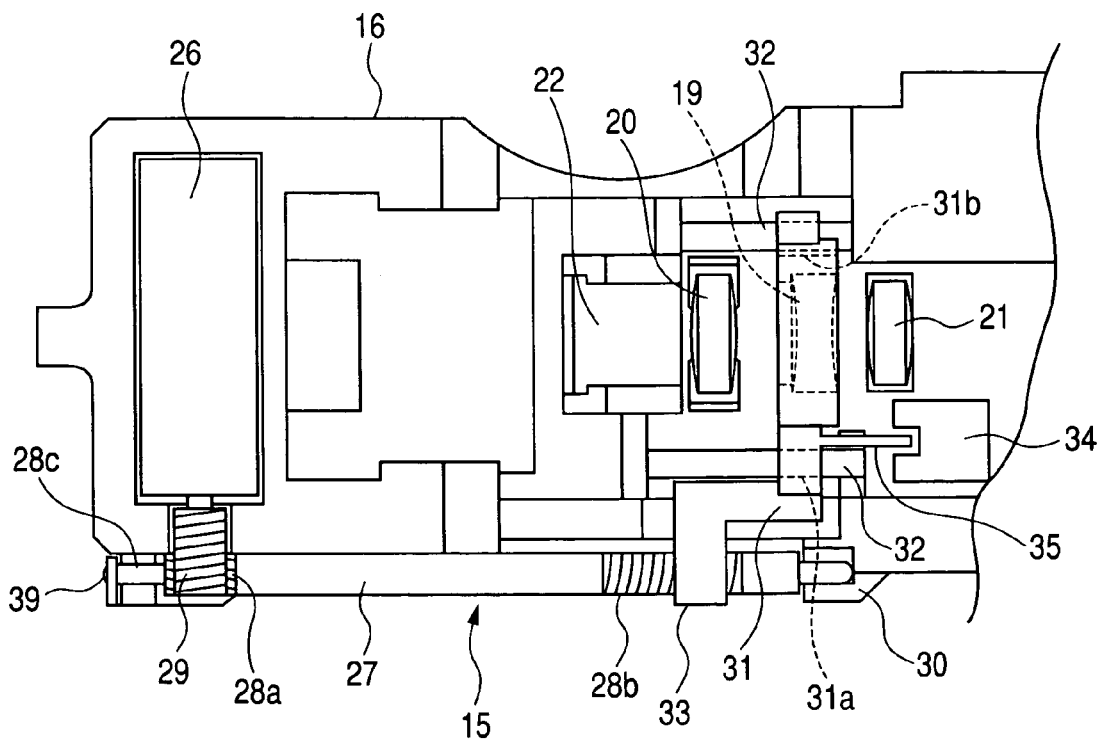
FIG. 3 is a plan view showing an initial position of a spherical aberration correction element driving mechanism.
Figure 5:
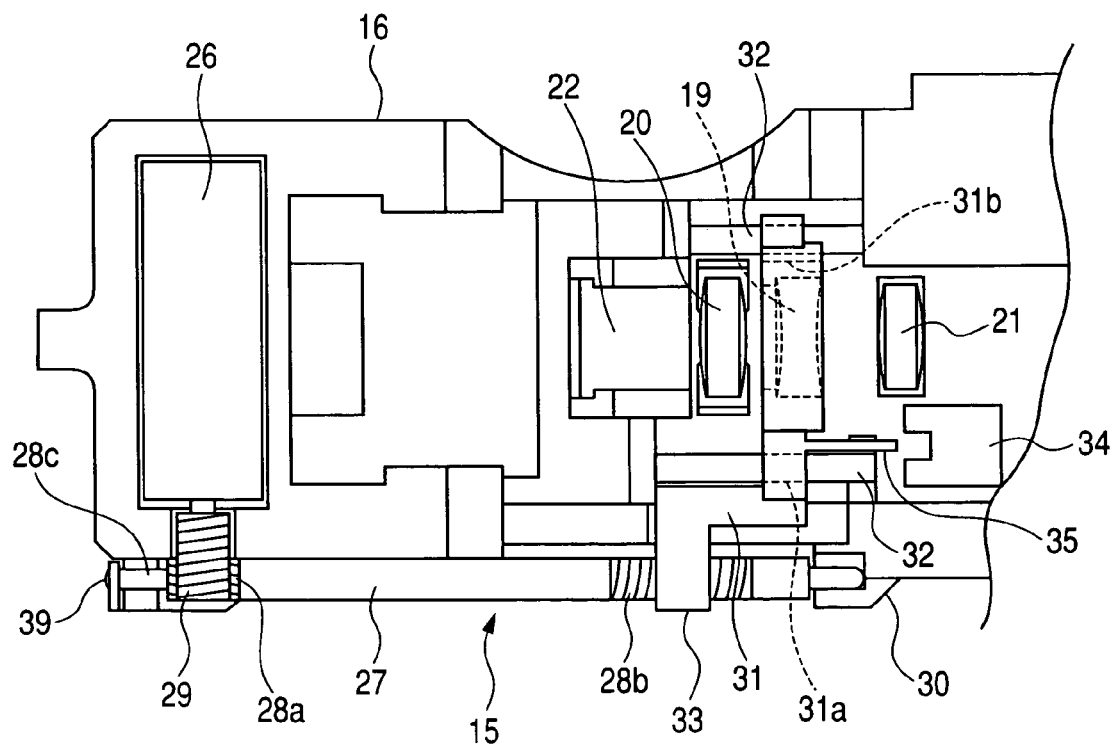
FIG. 5 is a plan view showing the position of the spherical aberration correction element driving mechanism after the supply of a predetermined pulse.
Figure 6:
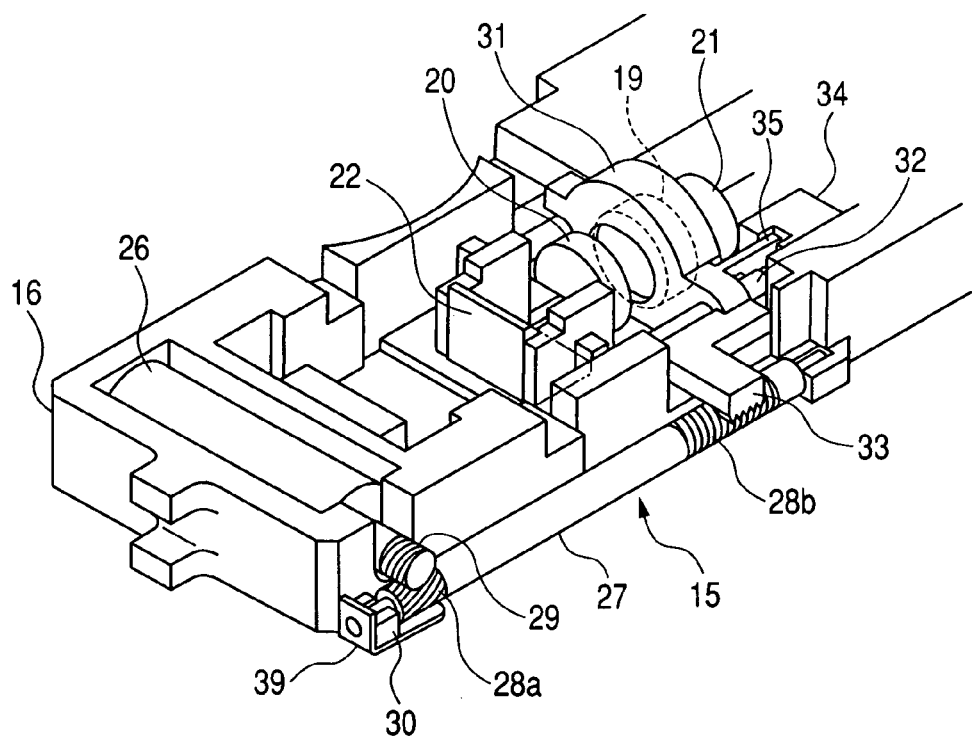
FIG. 6 is an exploded perspective view of an optical pickup device.
Figure 7:
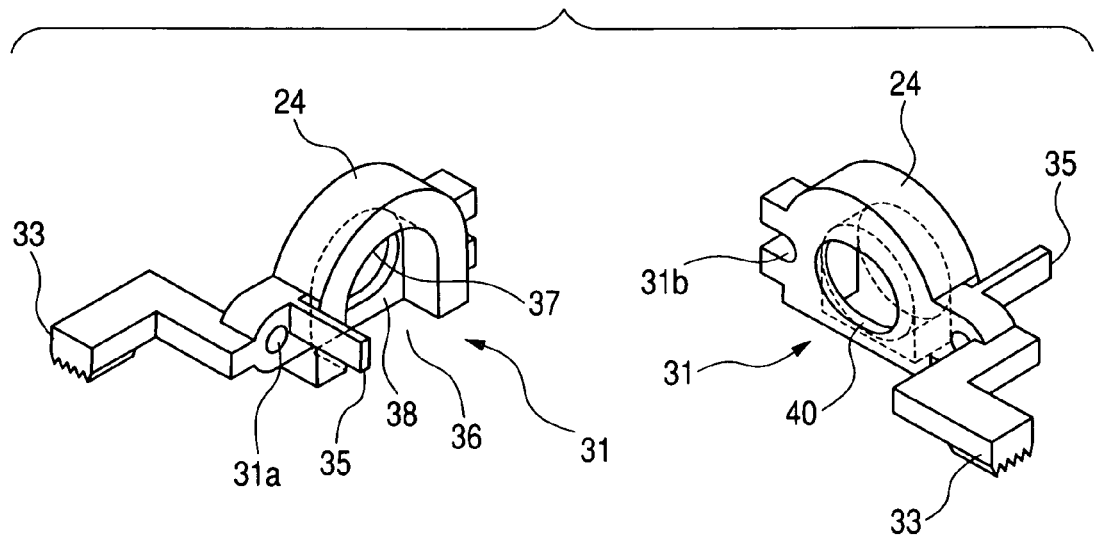
FIG. 7 is a perspective view of a lens holder as seen from two directions.

FIG. 2 is a sectional view of the optical pickup device 7 taken in the line 2-2 of FIG. 1. FIG. 3 is a plan view showing an initial position of a spherical aberration correction element driving mechanism; FIG. 4 is a side view of FIG. 3; FIG. 5 is a plan view showing the position of the spherical aberration correction element driving mechanism after movement thereof; FIG. 6 is an exploded perspective view of a spherical aberration correction element driving mechanism 16; and FIG. 7 is a perspective view of a lens holder as seen from two directions.

As shown in FIG. 2, in the optical pickup device 7, a semiconductor laser 17 serving as a light source is mounted in an optical base 16 constituting a base. The optical axis of the semiconductor laser 17 is parallel to the disk surface, and, after passing a predetermined optical system 18, a laser beam therefrom passes through a collimator lens 21, and sequentially passed through a movable optical element 19 for correcting spherical aberration and a stationary optical element 20, and is, further, reflected by a mirror 22 in a direction perpendicular to the optical disk 1. Thereafter, it passes through an objective lens 23 to be condensed on the recording surface of the optical disk 1. The beam reflected by the mirror 22 is a parallel beam, and the distance between the objective lens 23 and the optical disk 1 is determined to a predetermined working distance.

Thus, to achieve the optical disk apparatus of a thin type, it is desirable for the distance between the objective lens 23 and the mirror 22 to be as small as possible, thereby making it possible to reduce the distance between the cartridge 2 and the optical pickup device 7. Further, the optical pickup device 7 has a spherical aberration correction element driving mechanism 15 mounted thereon for driving the movable optical element 19 for spherical aberration correction. Further, although not shown in the drawings, the objective lens 23 is provided with a two-axis actuator for driving it in the focusing direction and the tracking direction.

As shown in FIG. 4, the movable optical element 19 is held by a lens holder 31, and the upper portion of a radial direction lens holding portion 24 of the lens holder 31 extends into the interior of the opening 3 of the cartridge. The portion of the radial direction lens holding portion 24 on a side opposite to the side of the upper portion is accommodated within the thickness of the optical base 16 without protruding beyond a bottom surface 25 of the optical base 16.

As shown in FIG. 6, the spherical aberration correction element driving mechanism 15 has a driving motor 26 on the optical base 16 and a spherical aberration correction element driving member 27 on a side surface of the optical base 16. At the forward end of the driving motor 26, there is provided a worm gear 29, which is in mesh with a helical gear 28a provided on the spherical aberration correction element driving member 27. The spherical aberration correction element driving member 27 is rotatably supported by a bearing portion 30 provided on the optical base 16.

The lens holder 31 is guided by two guide shafts 32 provided on the optical base 16, and can move in the optical axis direction of the movable optical element 19 (the direction shown by the arrow Y of FIG. 4). Further, the movable optical element holder 31 is equipped with a rack portion 33, which is in mesh with a worm gear 28b provided on the spherical aberration correction element driving member 27. Further, provided on the optical base 16 is a photo-interrupter 34 serving as a position sensor, detecting the position of the lens holder 31 (that is, the position of the movable optical element 19 in the optical axis direction) through insertion/detachment of a shielding plate 35 provided on the lens holder 31.

Further, as shown in FIG. 7, the lens holder 31 has a movable optical element mounting opening (recess portion) 36, which is equipped with a radial-direction positioning portion 37 and an optical-axis-direction positioning portion 38 for the movable optical element 19, with the movable optical element mounting opening 36 being formed so as to extend continuously toward the bottom surface of the optical base 16 down to the contour of the lens holder 31. The lens holder 31 is equipped with a lens holder opening 40 allowing passage of light emitted from the semiconductor laser 18.

The lens holder opening 40 is formed in an ellipsoidal configuration elongated in the radial direction of the optical disk 1. The lens holder 31 is formed, for example, of a resin allowing high precision molding like liquid crystal polymer, and cannot maintain the requisite strength if not endowed with a certain degree of wall thickness; in this embodiment, however, the lens holder opening 40 is formed in an ellipsoidal configuration, and the opening side of the movable optical element mounting opening 36 is reinforced, so that it is possible to maintain the requisite strength.

Further, in this embodiment, the lens holder 31 is protruded with respect to the optical base 16 only on the side of the cartridge 2. And, with the optical disk apparatus being loaded with a cartridge, the protruding portion (the forward end portion of the lens holder 31) is accommodated in the cartridge opening 3. Thus, the movable range of the movable optical element 19 on the optical base 16 is set. Further, the protruding portion does not protrude on the opposite side, i.e., the bottom surface side of the optical base 16. As a result, it is possible to bring the optical pickup device 7 close to the optical disk 1 and the cartridge 2.

Next, the operation of the spherical aberration correction element driving mechanism 15 of this embodiment will be described. First, the spherical aberration correction element driving mechanism 15 is used in order to correct spherical aberration generated due to a thickness error in the cover layer of the optical disk 1. That is, the movable optical element 19 is made movable in the optical axis direction, and correction is effected on a beam incident on the objective lens 23 such that the focus of the beam is formed on the recording layer of the optical disk irrespective of the thickness error of the cover layer. In performing this control, the movable optical element 19 is moved from a reference position by a predetermined distance, and the amplitude of an information reproduction signal is detected during the movement, the point where the reproduction signal amplitude is maximum being regarded as the correction position for the movable optical element 19.

More specifically, FIG. 3 shows a state of the lens holder 31 at a reference position in which the shielding plate 35 has been inserted into the photo-interrupter 34. When, in this state, the driving motor 26 constituting the drive source is rotated, the torque thereof is transmitted to the spherical aberration correction element driving member 27. The rotation of the spherical aberration correction element driving member 27 is transmitted to the rack portion 33 of the movable optical element holder 31, and the lens holder 31 moves in the optical axis direction of the movable optical element 19 while guided by the guide shaft 32. At this time, the lens holder 31 is fit-engaged with the guide shaft 32 by means of a hole portion 31*a* and an engagement portion 31*b*, and there is no fear of the optical axis of the movable optical element 19 being inclined or the center position thereof being deviated due to the movement of the lens holder 31.

As the driving motor 26, a stepping motor is used; based on control by a control circuit (not shown), a motor drive circuit (not shown) supplies predetermined pulses to the driving motor 26 while counting the pulses from a reference position. FIG. 5 shows a state after the supply of the predetermined pulses. During the movement, predetermined information of the optical disk 1 is reproduced by a reproducing circuit (not shown), and the amplitude of an information reproduction signal is detected by a detection circuit (not shown). The above-mentioned control circuit monitors the amplitude of the reproduction signal, and causes the driving motor 26 to make reverse rotation until a position is reached where the reproduction signal amplitude becomes maximum. In this way, the movable optical element 19 is moved to an optimum position where the reproduction signal amplitude becomes maximum, whereby any spherical aberration due to a thickness error in the optical disk 1 is corrected. There are no particular limitations regarding the information reproduced from the optical disk 1.

Here, when detecting the reference position by using the photo-interrupter 34, shielding is effected between a light-emitting element and a light-receiving element contained in the photo-interrupter 34 when the shielding plate 35 provided on the lens holder 31 enters a detection groove of the photo-interrupter 34. When the photo-interrupter 34 is shielded, pulse signals cease to be output to the driving motor 26 from the motor drive circuit (not shown), therefore the reference position detection is completed at this point in time, and position adjustment is performed on the above-described lens holder 31 using that position as the reference position. Thus, there is no need to apply any surplus load to the driving motor 26, and the reference position detection is possible in a short time while achieving power saving. Such correction of spherical aberration by the spherical aberration correction element driving mechanism 15 is effected when turning on the power, when replacing the optical disk 1, etc.

Further, the rack portion 33 of the lens holder 31 is in mesh with the worm gear 28*b* of the spherical aberration correction element driving member 27. The rack portion 33 is formed of resin and has elasticity, and is in contact with the worm gear 28*b* with no gap therebetween. Further, as shown in FIGS. 3 through 5, the spherical aberration correction element driving member 27 has a spherical shaft end 28*c* urged in the direction shown by the arrow Y of FIG. 4 by a plate spring 39. Thus, the lens holder 31 does not rattle in the optical axis direction, and can maintain the position of the movable optical element 19 with high accuracy. Further, since a small diameter stepping motor is used as the driving motor 26, a step angle becomes large. However, since two worm gears are used and the pitch thereof can become small, the reduction ratio can be made large, so that it is possible to control the movable optical element position with high accuracy, whereby it is possible to correct spherical aberration with high accuracy.

The present invention is not restricted to the above-described embodiment but allows various modifications without departing from the spirit of the present invention.

This application claims priority from Japanese Patent Application No. 2003-013006 filed Jan. 21, 2004, which is hereby incorporated by reference herein.

What is claimed is:

1. An optical disk apparatus for recording information on an optical disk accommodated in a cartridge or reproducing recorded information from the optical disk; comprising;
   a light source;
   an objective lens for condensing light from the light source on the optical disk;
   at least two optical elements arranged between the light source and the objective lens and having a predetermined refractive power;
   a moving mechanism for moving at least one of the optical elements along an optical axis to cancel spherical aberration of imaging light on a recording surface of the optical disk; and
   a lens holder for holding at least one of the optical elements, a part of the lens holder being inserted into an opening of the cartridge,
   wherein the lens holder has an ellipsoidal opening elongated in a radial direction of the optical disk.

2. An optical disk apparatus according to claim 1, wherein the lens holder has a recess portion into which the at least one of the optical elements is to be inserted, and a part of the lends holder on a side opposite to a side of the recess portion is open.

3. An optical disk apparatus according to claim 1, wherein the lens holder does not protrude from a bottom surface of an optical base.

4. An optical pickup device for use in an optical disk apparatus which records information on an optical disk accommodated in a cartridge or reproduces recorded information from the optical disk, comprising:
   a light source;
   an objective lens for condensing light from the light source on the optical disk;

at least two optical elements arranged between the light source and the objective lens and having a predetermined refractive power;

a moving mechanism for moving at least one of the optical elements along an optical axis to cancer spherical aberration of imaging light on a recording surface of the optical disk; and a lens hold for holding at least one of the optical elements, a part of the lends holder being inserted into an opening of the cartridge, and wherein the lens holder has an ellipsoidal opening elongated in a radial direction of the optical disk.

* * * * *

UNITED STATES PATENT AND TRADEMARK OFFICE
CERTIFICATE OF CORRECTION

PATENT NO. : 7,339,859 B2
APPLICATION NO. : 11/020103
DATED : March 4, 2008
INVENTOR(S) : Osamu Nagatsuka It is certified that error appears in the above-identified patent and that said Letters Patent is hereby corrected as shown below:

ON THE TITLE PAGE ITEM (57) ABSTRACT:

Line 8, "lend" should read --lens--.
Line 13, "folder" should read --holder--.
Line 14, "and which" should be deleted.

COLUMN 6:

Line 35, "disk; comprising;" should read --disk, comprising:--.

COLUMN 7:

Line 5, "cancer" should read --cancel--.

COLUMN 8:

Line 1, "hold" should read --holder--; and
Line 2, "lends" should read --lens--.

Signed and Sealed this

Ninth Day of September, 2008

JON W. DUDAS
*Director of the United States Patent and Trademark Office*